United States Patent [19]
Ashton et al.

[11] Patent Number: 5,454,943
[45] Date of Patent: Oct. 3, 1995

[54] DEVICE FOR THE MAGNETIC TREATMENT OF FLUIDS

[76] Inventors: Thomas E. Ashton, 11655 Colburn Rd., Chardon, Ohio 44024; Edward A. Mack, Jr., 11654 Yoder Rd., Marshallville, Ohio 44645

[21] Appl. No.: 786,266

[22] Filed: Nov. 1, 1991

[51] Int. Cl.⁶ .................................................. E21B 37/00
[52] U.S. Cl. .......................................... 210/222; 166/66.5
[58] Field of Search ................................... 210/222, 223, 210/695; 166/66.5

[56] References Cited

U.S. PATENT DOCUMENTS

| | | | |
|---|---|---|---|
| 5,024,271 | 6/1991 | Meihua | 210/222 |
| 5,052,491 | 10/1991 | Harms et al. | 210/222 |
| 5,122,277 | 6/1992 | Jones | 210/222 |

FOREIGN PATENT DOCUMENTS 1155086  10/1983  Canada .................................. 210/222

Primary Examiner—Matthew O. Savage

[57] ABSTRACT

A magnetic device for treating oil flowing through crude oil supply lines is disclosed which is constructed of two concentric tubes with a series of tiers of magnetic means interposed in the annular space formed by the concentric tubing. The tiers are spaced one from another by spacers and connecting means are provided at each end of the concentric tubing to attach the device in an oil well supply tube string. All of the magnets in each tier have the same magnetic pole facing toward the tubing axis. The outer tubing is formed of a ferrous material and the inner tube is formed of a nonferrous metallic material such as copper.

4 Claims, 1 Drawing Sheet

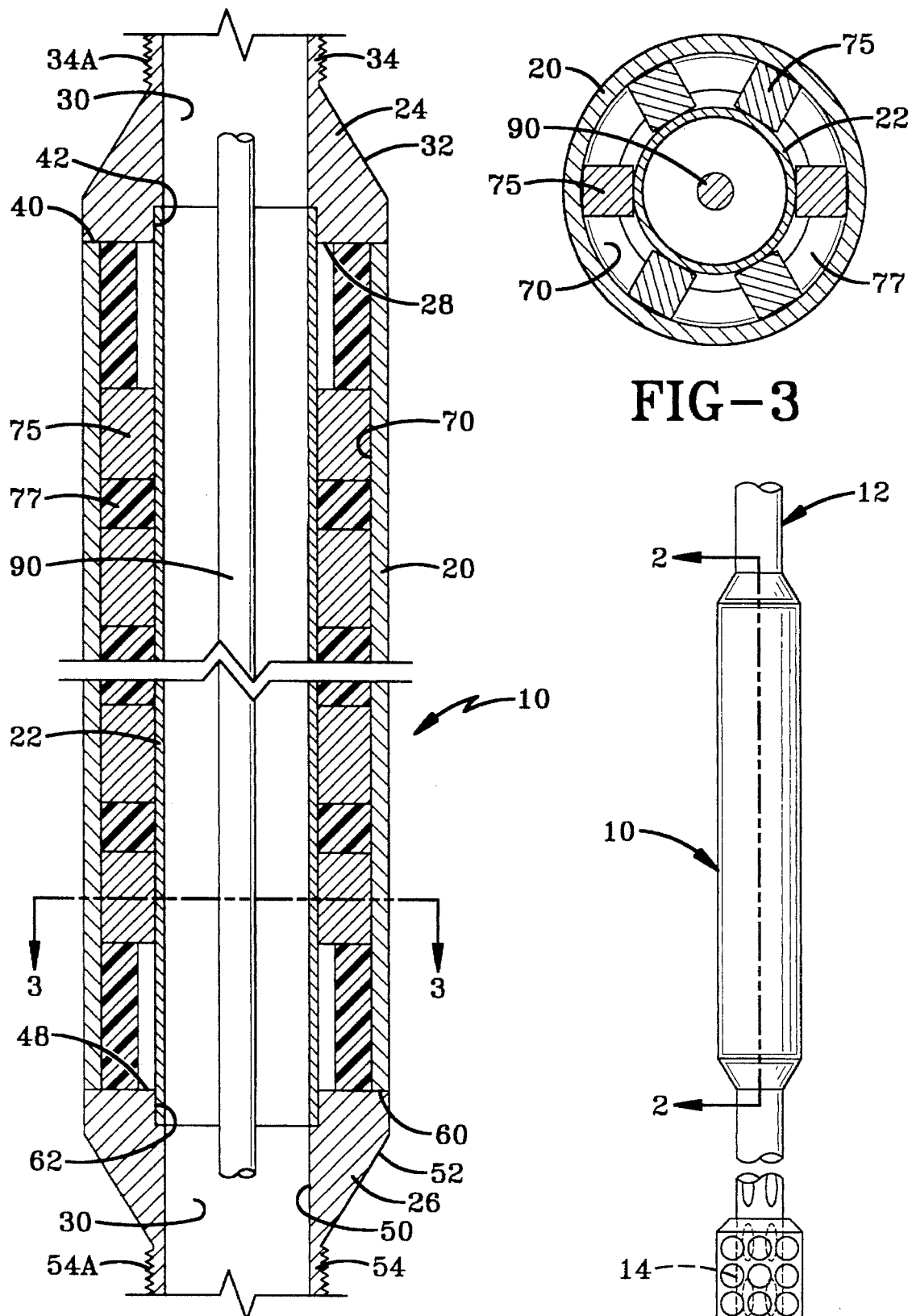

DEVICE FOR THE MAGNETIC TREATMENT OF FLUIDS

BACKGROUND OF THE INVENTION

1. Field of the Invention

The present invention relates to a device for magnetically treating fluids flowing through a conduit and more particularly the invention relates to a device for magnetically treating crude oil as it is being conveyed from an oil bearing structure in the ground to the surface to prevent the precipitation of paraffin in the conduit.

2. Description of the Prior Art

For at least the past twenty-five years, it has been known that the flow or travel of fluid through a conduit, and the fluid itself, can be influenced by the presence of a magnetic field in the conduit in which the fluid moves. For example, water being supplied to power plants, boilers, and other industrial water systems, can be treated by a magnetic field which effectively reduces the problems associated with the formation of scale and other precipitates in the water system. After treatment with a magnetic field, the water does not produce a hard scale on the walls of the conduits of the water system. Rather, a loose sludge is formed which will settle to the bottom of the system. The sludge can easily be removed or flushed from the water system. The interior of the piping system, therefore, does not require a more radical cleaning to maintain efficient operability of the system.

Gasoline being supplied as a fuel to automobile engines may be treated magnetically with a resulting increase in fuel efficiency and a reduction in the accumulation of various hydrocarbon deposits in the fuel carburation or injection system. The magnetic treatment, which may be accomplished by a rather simple and inexpensive magnetic device, results in increased fuel economy and decreased air pollution through the reduction of engine emissions and more complete fuel combustion.

While much is known about how the application of a magnetic field to a fluid flowing through a conduit affects the fluid, knowledge about all factors which contribute to the influence of the magnetic field is incomplete. Several theories have been proposed. Those skilled in the art, however, generally agree that the application of a sufficiently strong magnetic field to a flowing fluid will reduce the precipitation of material in solution in the fluid. In many cases, precipitation is unwanted and magnetic treatment provides desirable results.

In the oil production industry, paraffin precipitatation from crude oil as the crude oil flows from an oil bearing formation through production or supply tubing can present a serious problem. The paraffin precipitate will form deposits in the delivery system and impede the oil flow.

Frequently natural pressure in an oil bearing formation is too low to raise the oil to the ground from the oil bearing formation. Pumps are commonly employed to move the crude oil to the surface. The pumps, which are located underground, are operated by a pump rod driven by a prime mover. The pump rod extends through the production tubing between the prime mover and the pump.

The paraffin deposits, which commonly occur, are normally located at a position in the supply tubing just above the point where the crude oil being pumped reaches the cloud point of the oil. The cloud point, defined by ASTM standards, is, broadly, that temperature at which paraffin first begins to precipitate in the crude oil.

Paraffin deposits in the supply tubing will eventually clog the tubing or restrict movement of the pump rod or both. When oil flow through the system is restricted it becomes necessary to clean the system. To obviate this problem, it is common to employ periodic preventative cleaning procedures so that production is not unduly interrupted.

These preventative procedures, while necessary, are costly and undesirable. First, cleaning requires that the well be shut down during cleaning, and production time is lost. Second, the cleaning procedures require the use of capital equipment and labor and, therefore, involves nonproductive expense. Third, hazardous chemicals are commonly used in the cleaning procedures and a negative impact on the environment is possible. All of these factors contribute to higher oil production costs.

Brine, which promotes corrosion, other corrosive materials, and scales of various types, are also present in an oil well environment. The magnetic treatment of oil, as it flows through a supply tube can substantially reduce the formation of scales, the corrosion promoting property of the brine and the corrosive effect of other materials in the oil.

It has been theorized that the paraffin precipitation problem in oil wells results because paraffin is naturally present in solution in many crude oil formations. As the crude oil is transmitted from the oil bearing formation to the surface, pressure and temperature changes occur. If the cloud point is reached, paraffin will precipitate from the crude oil as it moves through the supply tubing. The paraffin formation and deposition occur because of chemical, mechanical, and electrical effects. It is also theorized that paraffin forms by chemical reaction in the crude oil while the crude oil moves through supply tubing by changes in pressure and temperature.

The movement of crude oil, through either the oil bearing formation in the earth or the tubing which delivers the crude to the surface, will create an electrical potential. It is believed that this electrical potential contributes to the formation and precipitation of paraffin. Regardless of the exact mechanisms involved, whether they be mechanical, chemical or electrical, in some environments, paraffin does accumulate in oil supply tubing. This accumulation of paraffin in the supply tubing is a problem which must be addressed. Further, it is known that the treatment of crude oil as it flows through supply tubing with a magnetic field will substantially reduce and, in some instances, totally eliminate the precipitation, deposition, and accumulation of paraffin in oil well supply tubing.

The prior art has addressed the precipitation problem in general, and several examples of proposed solutions are known in the art. One example is Weisenbarger U.S. Pat. No. 4,995,425. This patent discloses a magnetic fluid treatment device having a pair of elements containing permanent magnets mounted in housing members. The housing members are placed around a fluid conduit to direct the magnetic field flux to the flowing fluid. This reference is primarily concerned with the magnetic treatment of water conduits such as the plumbing supply system of a residential construction. However, the reference does indicate that the device of the disclosure can be used in an oil well environment.

Hertzog, U.S. Pat. No. 4,946,590 discloses a magnetic water treatment device which is intended to be clamped upon domestic plumbing supply systems. The device shown in this disclosure is in many ways similar to the Weisenbarger device. The differences reside in the arrangement of the magnets used in the construction.

O'Meara, Jr., U.S. Pat. Nos. 4,289,621; 4,417,984; and 4,564,448 each shows various devices for treating fluids flowing through a conduit with a magnetic field to reduce the formation of precipitates from material in solution in the fluid. Each of these devices includes a magnet member that is mounted inside the tubing through which the fluid flows.

Each of the devices of the prior art, as represented by the references noted, includes drawbacks, particularly if such devices are to be used in an oil well environment. For example, the O'Meara, Jr. references each disclose structures having magnets mounted inside a fluid conduit. Such a structure is totally unsatisfactory or unsuitable for use in an oil well. The placement of magnetic means in the path of oil flow will obstruct the oil movement. Also, pump rod operation will be impeded in those oil wells having pumps.

Weisenbarger and Hertzog also disclose structures which would be unsuitable for use in an oil well environment. Both disclosures involve devices which are clamped around the exterior of the fluid conduit. Oil well equipment is subjected to heavy wear, tear and abuse from the various forces, pressures, and other actions which typically occur in the drilling, installation and operation of an oil well. This abuse is exacerbated where the desired location for magnetic treatment is located a substantial distance below the surface of the earth.

Accordingly, there are numerous oil wells in existence in which paraffin buildup presents a problem, and a serious need exists for a device which will either substantially reduce or eliminate the paraffin buildup problem. Several characteristics of such a device are necessary when the device is to be used in an oil well environment. For example, the device must be rugged and capable of withstanding the abuse which is inevitably encountered in the oil well industry. Secondly, the device should not interfere with the flow of crude oil through the supply tubing. To do so would contribute to the problem the device is designed to eliminate. Third, the device should be of a character which is compatible with equipment which is normally present in the oil drilling and supply industry. Additionally, the treatment equipment should be cost effective so that its employment and use do not unduly increase the net maintenance costs associated with a typical oil well.

Ideally, therefore, the cost of including magnetic treatment equipment should be equal to or exceeded by the savings resulting from the employment and use of the equipment.

Accordingly, it is a primary object of the present invention to provide a magnetic treatment device for reducing paraffin buildup in an oil well, which device becomes an integral part of the supply tubing or conduit, and does not interfere with the flow of crude oil passing through the conduit.

It is also an object of the present invention to provide a magnetic treatment device for oil wells which is capable of being mounted in and become a part of the string of pipe which forms the oil supply tubing or conduit of an oil well.

It is a further object of the present invention to provide a magnetic treatment device for oil well use which is an integral part of the oil supply system.

It is a further object of the present invention to provide a magnetic treatment device for oil well use which either substantially decreases or eliminates the precipitation of paraffin in the crude oil supply system of the oil well.

It is likewise an object of the present invention to provide a magnetic treatment device for oil well use in which the device may be placed at any position in the string of pipe which forms the oil supply tube or conduit of a oil well crude oil supply system, which location is normally determinted by the position of the "cloud point" of the oil flowing through the crude oil supply system.

It is an additional object of the present invention to provide a magnetic treatment device for oil well use which is mounted within the oil well casing that normally forms a part of an oil well crude oil supply system.

SUMMARY OF THE INVENTION

These objects and other objects and advantages can be obtained by the construction of the present invention and its use in oil well supply systems. The general nature of the construction of the magnetic treatment device of the present invention may be stated as including a pair of elongated and generally cylindrical tube members extending between a head retainer member and a tail retainer member. The pair of tube members includes an inner tube and an outer tube which are concentric with each other. The inner tube is preferably formed of copper and has an internal diameter approximately equal to the internal diameter of the supply tubing used in the crude oil supply system in which the device is to be used. The outer tube member is preferably formed of a ferrous material and has an internal diameter greater than the outside diameter of the inner tube member, and an outer diameter smaller than the internal diameter of the oil well casing of the crude oil supply system.

The outer tube member is welded to the head retainer member and the tail retainer member, and the inner tube member is slip-fit into an annular counterbore formed in each of the head and tail members. The head and tail members are generally ring-shaped and include nipples formed on the respective outer ends. These nipples include threads so that the device may be attached to the supply tubing at any desired position. The nipple threads match the threaded connections used in the oil supply tubing or conduit of the crude oil supply system.

The inner tube member and outer tube member, head and tail members, define an elongated annular space. A plurality of permanent magnets are mounted within the annular space in a series of tiers along the length of the annular space. Each tier of magnets includes a plurality of individual magnets, and each individual magnet in each tier has the same magnetic pole facing inwardly. The tiers of plurality of magnets are spaced apart from each other along the length of the annular space and are held in position by a plurality of nonmagnetic spacer members which are positioned between each tier of magnets.

In use, the device is positioned in a crude oil supply system at a location a short distance below the "cloud point" of the oil being produced from the particular well. This position may vary from well to well depending upon a variety of factors which may be unique to each individual well and may include, among other factors, oil bearing formation pressure and temperature, chemical compositions of the crude being produced, and the distance below ground level of the oil bearing formation.

Each of the head and tail members is attached in the string of supply tubing or conduit by employing the normal pipe fittings which are used to connect lengths of supply tubing to one another. Since the internal diameter of the inner tube member is approximately equal to the internal diameter of the supply tubing, oil flow through the device is not impeded by any element of the device. Also, a pump rod can extend through the device as it extends through the supply tubing without interference by the device in those cases where a pump is required.

DESCRIPTION OF THE PREFERRED EMBODIMENT

A preferred embodiment of the present invention is illustrated in the accompanying drawing, and the advantageous, new and useful results obtained by the construction of the preferred embodiment are set forth in the following description and claims.

In the drawing:

FIG. 1 is a fragmentary elevation illustrating the magnetic treatment device of the present invention mounted in an oil well supply tube or conduit;

FIG. 2 is a vertical cross section of the magnetic treatment device of the present invention taken on the lines 2—2 of FIG. 1; and FIG. 3 is a horizontal cross section of the magnetic treatment device of the present invention taken along the lines 3—3, FIG. 2.

Similar numerals refer to similar parts throughout the various figures of the drawing.

Referring to FIG. 1, the device of the present invention is generally indicated at 10 and is mounted at a desired position in the supply tube 12 of the crude oil supply system within the oil well casing (not shown). The desired location for mounting the device will be determined by the particular "cloud point" of the oil in the particular oil well system. This location is that point in the supply system where the "cloud point" of the oil is reached as crude oil flows from an oil bearing formation to a collection facility located at the surface. In a typical system, a perforated nipple 14 is located at the lower end of the production or supply tubing 12. This nipple 14 is positioned in the oil bearing formation to admit crude oil from the formation into the supply tubing for delivery to collection and distribution facilities.

The magnetic treatment device of the present invention is mounted in the string of production tubing at the desired location as determined in the manner indicated above by attaching the device 10 to the tubing 12 with standard couplings or fittings normally used to attach lengths of supply tubing to one another.

The device 10 includes an outer tubular member 20 and an inner tubular member 22. The device 10 also includes a head retainer member 24 and a tail retainer member 26 which are similarly shaped. Outer tube member 20, head member 24, and tail member 26 are each formed of a ferrous material, and inner tubular member 22 is formed of a length of copper tubing of relatively thin walled construction.

Outer tube 20 and inner tube 22 are concentric with one another and extend between head retainer 24 and tail retainer 26. Both head retainer 24 and tail retainer 26 are machined from a ring of solid material. Head retainer 24 includes a bottom face 28, an internal bore 30, and an outer face 32 which terminates in nipple 34. Nipple 34, which is generally tubular in shape, has a threaded portion 34a formed thereon. Threads 34a are adapted to mate with coupling or fitting members which are used in the typical supply tubing or conduit used in the oil well supply system.

Outer tube 20 is welded to head retainer 24 at its upper end 40 to head retainer 24 at the juncture of outer face 32 and bottom face 28. Inner tube 22 is mounted in counterbore 42 formed in inner face 30 of head retainer 24.

Similarly, tail retainer 26 is provided with a top face 48, inner face 50, outer face 52, and terminates in nipple 54 having threads 54a. Tail retainer 26 also includes a counterbore 62 and is welded to outer tube 20 at 60 defined by the juncture of faces 48 and 52. Head retainer 24 and tail retainer 26 are identical to one another. The device 20 is symmetrical and the position could be oriented 180° from that shown in FIG. 2.

Outer tube 20, inner tube 22, head retainer 24, and tail retainer 26 define an annular space 70. In accordance with the present invention, a plurality of permanent magnets 75 are positioned in a series of tiers extending between head retainer 24 and tail retainer 26. A top spacer 76 maintains the position of the first tier of magnets 75, and each tier of magnets 75 is separated by spacers 77. A bottom spacer 78 is positioned between the bottom tier of magnets 75 and the tail retainer 26.

Each tier of magnets 75 includes a plurality of individual magnets, and in FIG. 3, six individual magnets are illustrated. More or less magnets could be used in each tier depending upon the flux strength of each individual magnet. In accordance with the present invention, each of the individual magnets in a tier is oriented with the south pole facing inwardly or toward the inner tubular member 22. Each of the tiers of magnets 75 are duplicates of each other and, therefore, all of the magnets in the assembly will have the south pole facing toward the inner tube 22.

It is preferred that flux density at the center line of inner tube 22 be at least in the range of 600 to 800 gauss. This flux density may be achieved by selecting the correct magnetic properties of the individual magnets 75 which comprise each tier of the assembly.

The magnets 75 are of the permanent type. A number of types of such permanent magnets are readily available commercially and suitable for use. It is preferred that ceramic permanent magnets make up the individual tiers of magnets 75. They are easy to obtain in the correct shape, and they may be manufactured with the desired field strength. Also, they are not substantially affected by the environment present in an oil well.

As mentioned above, each of the magnets in each of the tiers is positioned with its south pole facing inwardly toward the center line of inner tube 22. The device includes a plurality of tiers and each tier includes a plurality of magnets 75. The length of the device can be of any convenient or desired amount. However, an over-all length of approximately 36" has proven to be satisfactory. Each of the magnets 75 is approximately twice the length of spacers 77. Therefore, the ratio distance occupied by the magnets in the device is 2 to 1 with respect to the distance occupied by spacers in the annular space 70. As noted above, however, the important aspect of the construction is that the field density is preferably in the range of 600 to 800 gauss along the length of the device.

As noted above, the outer tubular member 20 is formed of a ferrous material, preferably steel tubing. This serves several purposes. First, it permits easy manufacture and assembly of the device by welding procedures. Second, the ferrous nature of the outer tubing 20 contributes to a concentration of the magnetic field within the interior of the device and, third, the steel tubing readily contains the pressures present in a crude oil delivery system whether from pressures naturally present in the oil bearing formation or from pressure created by a pump used to raise the oil from the oil bearing formation to the surface.

In many parts of the country, the use of such a pump is necessary to recover oil from an oil bearing formation because the natural pressure present in the formation is not great enough to raise the oil to the surface. In those wells where a pump is used, it is typically of the down hole variety where the actual pump is located adjacent to the oil bearing formation and inside supply tubing or conduit. The pump is operated by a rod which extends from the surface where it is powered by a prime mover to the pump where rod movement will operate the pump. These rods extend through the interior of the supply tubing and a typical pump rod is illustrated in the drawing at 90. It should be understood, however, that in some oil well environments, natural pressure is sufficient to raise the oil to the surface without pump assistance and a pump is not necessary.

The device is installed in a very simple and inexpensive manner. As the supply tube is placed from the surface to the oil bearing formation, lengths of pipe are coupled together with standard fittings or couplings. When a well encounters a paraffin buildup problem, the "cloud point" area is readily determined by the location of the start of paraffin buildup. The device is attached to one end of the length of supply pipe at a location slightly below the "cloud point". The other end of the device is secured to the next length of supply pipe forming the supply pipe string.

The device becomes an integral part of the supply pipe. Nothing in the device interferes with the flow of oil through the system. The interior diameter of the device, which includes the interior diameter of the inner tube 20, and the internal bores 30 of head retainer 24 of tail retainer 26, is the same as that of the supply pipe.

In actual use, under test conditions, devices have been installed in oil well environments where paraffin buildup required at least monthly preventive maintenance procedures described above. After installation of the device of the present invention, the wells which previously required preventive maintenance procedures displayed no significant paraffin buildup, and successfully eliminated the requirement for maintenance or cleaning.

The magnetic treatment device of the present invention provides several distinct advantages and solutions to problems in the crude oil industry. First, the device can be economically and easily installed in a supply tubing string without interfering physically with the flow of oil through the system. Second, the device fits easily within the typical oil well casing and, therefore, does not require any special installation procedures or alterations. Third, the device requires virtually no maintenance of its own since the materials present in the device are not substantially affected by the many environmental conditions present in an oil well. Further, the device is very cost-effective since common and readily available materials are used in its construction. Also, the low capital investment and low maintenance requirements result in an over-all investment which is substantially less than the cost normally required for cleaning procedures, particularly over a period of time. Additionally, the device is capable of being used in virtually any situation where paraffin buildup or other precipitate problems are encountered in a crude oil well system. Finally, the device substantially reduces other problems caused by brine and scale formation commonly encountered in oil well environments.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustraion of the invention is by way of example, and the scope of the invention is not limited to the exact details of the construction shown or described.

Having now described the features, discoveries and principles of the invention, the manner in which the improved device for the magnetic treatment of fluids is constructed, assembled and operated, the characteristics of the new construction, and the advantageous, new and useful results obtained; the new and useful structures, devices, elements, arrangements, parts and combinations are set forth in the appended claims.

We claim:

1. Magnetic treatment device for treating oil flowing through crude oil well supply tubing, including an outer tubular member and an inner tubular member concentric and coaxial with the outer tubular member, a head retainer member and a tail retainer member, said head and tail retainer members each including a nipple having a bore formed therethrough coaxial with the tubular members, the head retainer member and the tail retainer member each having a counter bore formed therein coaxial with said bores and the inner tubular member, the outer tubular member and the inner tubular member each having a head end and a tail end, the head end of the outer tubular member and the head end of the inner tubular member being attached to the head retainer member, the tail end of the outer tubular member and the tail end of the inner tubular member being attached to the tail retainer member, the inner tubular member being mounted in the counter bores formed in the head retainer member and the tail retainer member and extending between said head and tail retainer members, the diameters of the bore formed through the head retainer member and the tail retainer member each being equal to the internal diameter of the inner tubular member; the inner tubular member, outer tubular member, head retainer member and tail retainer member defining an elongated annular space, a plurality of tiers of magnets mounted in the annular space, each tier of magnets having a plurality of individual magnet members, the individual magnet members in each tier being arranged to completely surround the inner tubular member at each tier location, each magnet member having opposed polar faces, a plurality of ring-shaped spacer members formed of nonmagnetic material located and arranged in the annular space and extending between each tier of magnets, a head spacer member formed of nonmagnetic material located between the first tier of magnets and the head retainer member in the annular space and a tail spacer member formed of nonmagnetic material located between the last tier of magnets and the tail retainer member in the annular space, all of the individual magnets in all of the tiers being positioned with the same polar face adjacent to the inner tubular member whereby each tier of magnets includes a continuous magnetic face of the same polarity entirely surrounding the inner tubular member at each tier location, and said device being symmetrical about an imaginary axis perpendicular to the axis of the tubular members at the midpoint between the head retainer member and the tail retainer member whereby said device may be mounted in oil well supply tubing with the head retainer member position and the tail retainer member position being interchangeable with one another.

2. Magnetic treatment device as defined in claim 1 in which said outer tubular member is formed of a ferrous metal and in which said inner tubular member is formed of copper.

3. Magnetic treatment device as defined in claim 1 in which said outer tubular member is welded to said head and tail retainer members to provide containment of the pressure exerted by oil flowing through the inner tubular member.

4. Magnetic treatment device as defined in claim 1 in which each tier of individual magnet members is twice the length of each of the ring-shaped spacer members in the direction parallel to the axis of the tubular members, whereby the ratio of the distance occupied by the magnetic members in the plurality of tiers is 2 to 1 with respect to the distance occupied by the spacer members between the head and tail spacers.

* * * * *